United States Patent
Yamamoto et al.

(10) Patent No.: US 6,756,153 B1
(45) Date of Patent: Jun. 29, 2004

(54) BINDER COMPOSITION FOR ELECTRODE FOR LITHIUM-ION SECONDARY BATTERY AND UTILIZATION THEREOF

(75) Inventors: Haruhisa Yamamoto, Tokyo (JP); Akira Nakayama, Kawasaki (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 09/889,560

(22) PCT Filed: Jan. 21, 2000

(86) PCT No.: PCT/JP00/00282

§ 371 (c)(1),
(2), (4) Date: Jul. 27, 2001

(87) PCT Pub. No.: WO00/45452

PCT Pub. Date: Aug. 3, 2000

(30) Foreign Application Priority Data

Jan. 28, 1999 (JP) .......................... 11-019709

(51) Int. Cl.$^7$ ............................... H01M 4/62
(52) U.S. Cl. .................. 429/217; 526/319; 429/231.95; 252/182.1
(58) Field of Search ......................... 526/319; 429/217, 429/231.95; 252/182.1

(56) References Cited

U.S. PATENT DOCUMENTS

| | | | |
|---|---|---|---|
| 5,595,841 A | * 1/1997 | Suzuki | 429/217 |
| 5,631,100 A | * 5/1997 | Yoshino et al. | 429/62 |
| 5,948,464 A | * 9/1999 | Delnick | 427/77 |
| 5,972,056 A | * 10/1999 | Brikez | 29/623.5 |
| 6,183,907 B1 | * 2/2001 | Barusseau et al. | 429/217 |
| 6,265,107 B1 | * 7/2001 | Shimizu et al. | 429/217 |
| 6,299,653 B1 | * 10/2001 | Hoshi et al. | 29/623.1 |
| 6,399,246 B1 | * 6/2002 | Vandayburg et al. | 429/217 |

FOREIGN PATENT DOCUMENTS

| | | |
|---|---|---|
| JP | 04-255670 | 9/1992 |
| JP | 06-223833 | 8/1994 |
| JP | 06-325766 | 11/1994 |
| JP | 08-287915 | 11/1996 |
| JP | 09-199135 | 7/1997 |
| JP | 10-069912 | 3/1998 |
| JP | 10-188991 | 7/1998 |
| WO | WO98/14519 | 4/1998 |

* cited by examiner

Primary Examiner—David W. Wu
Assistant Examiner—Henry S Hu
(74) Attorney, Agent, or Firm—Armstrong, Kratz, Quintos, Hanson & Brooks, LLP

(57) ABSTRACT

A binder composition used for making an electrode for a lithium-ion secondary battery, which comprises polymer particles dispersed in an organic medium having a boiling point of 80–350° C. at normal pressure. The polymer (1) comprises structural units derived from a monoethylenically unsaturated carboxylic acid ester monomer, and at least one kind of structural units selected from (b) structural units derived from a monoethylenically unsaturated carboxylic acid monomer and (c) structural units derived from a conjugated diene monomer; (2) has a ratio of (a)/[(b)+(c)] of 99/1–60/40 by weight; (3) has a total content of (a), (b) plus (c) of at least 80 wt. % based on the total structural units; and (4) is substantially free from structural units of a monoethylenically aromatic hydrocarbon monomer. A lithium-ion secondary battery having an electrode made with the binder exhibits a large service capacity and enhanced charge-discharge characteristics at a high temperature.

18 Claims, No Drawings

BINDER COMPOSITION FOR ELECTRODE FOR LITHIUM-ION SECONDARY BATTERY AND UTILIZATION THEREOF

TECHNICAL FIELD

This invention relates to a binder composition for an electrode of a lithium ion secondary battery, and utilization of the binder.

BACKGROUND ART

In recent years, portable electronic appliances such as a notebook-sized personal computer, a portable telephone and a personal digital assistant have spread wide. Among secondary batteries used as a power source of the portable electronic appliances, lithium ion secondary batteries are widely used.

Requirements for rendering portable electronic appliances small in size, thin in thickness, light in weight and high in performance are becoming severe. Thus the same requirements are also becoming severe for lithium ion secondary batteries (hereinafter abbreviated to "batteries" when appropriate). In addition, requirement for cost reduction is eagerly desired.

As a binder for an electrode of a lithium ion secondary battery, polyvinylidene fluoride (hereinafter abbreviated to "PVDF") is widely used. However, secondary batteries having desired performances are difficult to fabricate with PVDF, because it is presumed that PVDF has a poor binding power.

Now various binders are being suited for providing secondary batteries having high performances. Polymers having structural units derived from a polar group-having monomer such as an ethylenically unsaturated carboxylic acid ester monomer attract widespread attention because these polymers give high adhesion between an active material and a collector. For example, polymer binders having structural units derived from an ethylenic hydrocarbon monomer was proposed, which include a copolymer of an ethylenically unsaturated carboxylic acid ester monomer, an ethylenic hydrocarbon monomer and an ethylenically unsaturated dicarboxylic acid anhydride monomer, which copolymer contains at least 40% by weight of structural units derived from the ethylenic hydrocarbon monomer (Japanese Unexamined Patent Publication [hereinafter abbreviated to "JP-A"] No. H6-223833), and a copolymer of an ethylenically unsaturated carboxylic acid ester monomer, an ethylenic hydrocarbon monomer and an ethylenically unsaturated dicarboxylic acid (or ester) monomer, which copolymer contains at least 40% by weight of structural units derived from the ethylenic hydrocarbon monomer (JP-A H6-325766). Further, a copolymer of at least one acrylic acid ester or methacrylic acid ester monomer, an acrylonitrile monomer and a vinyl monomer having an acid ingredient (JP-A H8-287915) and a methyl methacrylate-butadiene copolymer rubber (JP-A H4-255670) were proposed. A secondary battery having a positive electrode or negative electrode made by using these copolymer binders, exhibits good battery performances, especially good characteristics at repetition of charge-discharge cycles and a larger capacity. This is because these copolymer binders exhibits stronger force for binding an active material to each other and to a collector, than that obtained with PVDF binder. The amount of the binders can be reduced and thus the weight of a secondary battery can be reduced, as compared with the case where PVDF binder is used. Further, these copolymer binders are relatively inexpensive and thus the fabrication cost of a battery can be reduced. Thus, these copolymers are expected to be good binders.

With spread and development of portable electronic appliances, they are occasionally used and stored under various conditions, especially at a high temperature of 50° C. or higher. A lithium ion secondary battery with an electrode made using the conventional PVDF binder exhibits good characteristics at repetition of charge-discharge cycles at room temperature of 20 to 25° C., but poor characteristics at repetition of charge-discharge cycles at a high temperature of 50° C. or higher. Thus, researches are being made for improving materials used for a battery, a method for fabricating a battery and structure of a battery to obtaining good characteristics of a battery at a high temperature, but satisfactory results have not been obtained. There is still an increasing need for improvement of a binder used for an electrode.

The present inventors found that a secondary battery having an electrode made by using the above-specified copolymer binders instead of the PVDF binder exhibits good characteristics at repetition of charge-discharge cycles at room temperature, but the characteristics at repetition of charge-discharge cycles are still reduced at a high temperature of 50° C. or higher, which is prominent with copolymer binders containing structural units derived from an ethylenic hydrocarbon monomer or having a salient amount of a nitrile group.

A binder composition in the form of a polymer dispersion which comprises a polymer having a gel content of at least 50% as calculated as a toluene insoluble matter, and an organic dispersion medium having a boiling point of at least 80° C. at normal pressure, has been proposed in WO 98/14519. This binder composition in a polymer dispersion form exhibits an enhanced strong force for binding an active material to each other and to a collector, and a battery with an electrode made by using the binder composition exhibits good characteristic at repetition of charge-discharge cycles, as compared with a binder composition in the form of a polymer solution in an organic solvent.

Further researches of the present inventors have revealed that a secondary battery having an electrode made by using a binder composition, specifically described in WO 98/14519, exhibits good characteristics at repetition of charge-discharge cycles at room temperature, but the characteristics at repetition of charge-discharge cycles are reduced at a high temperature of 50° C. or higher. It is presumed that the reduction of the characteristics at repetition of charge-discharge cycles at a high temperature is due to the fact that the specific binder composition contains structural units derived from an aromatic hydrocarbon monomer.

DISCLOSURE OF THE INVENTION

As extensive researches of a lithium ion secondary battery exhibiting good characteristics at repetition of charge-discharge cycles at a high temperature, the present inventors have found that, when a polymer binder comprising a dispersion of a specific polymer dispersed in a specific organic liquid dispersion is used for the preparation of an electrode, a secondary battery with the electrode exhibits enhanced characteristics at repetition of charge-discharge cycles at a high temperature. The present invention has been completed on the basis of this finding.

Thus, in a first aspect of the present invention, there is provided a binder composition for an electrode of a lithium ion secondary battery, which comprises particles of a polymer and an organic liquid dispersion medium having a boiling point in the range of 80° C. to 350° C. at normal pressure; the polymer particles being dispersed in the organic liquid dispersion medium, and said polymer comprising:

(a) structural units derived from a monoethylenically unsaturated carboxylic acid ester monomer, and at least one kind of structural units selected from (b) structural units derived from a monoethylenically unsaturated carboxylic acid monomer, and (c) structural units derived from a conjugated diene monomer;

the ratio of structural units (a)/[structural units (b) plus structural units (c)] being in the range of 99/1 to 60/40 by weight, provided that the sum of structural units (a), structural units (b) and structural units (c) is 100;

the sum of structural units (a), structural units (b) and structural units (c) being at least 80% by weight based on the weight of the total structural units of the polymer; and said polymer being substantially free from structural units derived from a monoethylenically aromatic hydrocarbon monomer.

In a second aspect of the present invention there is provided a slurry for an electrode of a lithium ion secondary battery (which slurry is hereinafter referred to as "slurry" when appropriate), which comprises the above-mentioned binder composition and an active material.

In a third aspect of the present invention there is provided an electrode of a lithium ion secondary battery, which is made by using the above-mentioned slurry.

In a fourth aspect of the present invention there is provided a lithium ion secondary battery, which is fabricated by using the above-mentioned electrode.

BEST MODE FOR CARRYING OUT THE INVENTION

The invention will be described in detail.

1. Binder Composition

The binder composition of the present invention is a dispersion of particles of a specific polymer in an organic liquid dispersion medium having a boiling point in the range of 80° C. to 350° C. at normal pressure. The amount of the polymer particles in the binder composition is usually in the range of 0.2 to 80% by weight, preferably 0.5 to 70% by weight, and more preferably 0.5 to 60% by weight, based on the weight of the binder composition.

Polymer Particles

The polymer particles used in the present invention comprise (a) structural units derived from a monoethylenically unsaturated carboxylic acid ester monomer (hereinafter abbreviated to as "structural units (a)" when appropriate), and (b) structural units derived from a monoethylenically unsaturated carboxylic acid monomer (hereinafter abbreviated to as "structural units (b)" when appropriate) and/or (c) structural units derived from a conjugated diene monomer (hereinafter abbreviated to as "structural units (c)" when appropriate), and is substantially free from structural units derived from a monoethylenically aromatic hydrocarbon monomer, the sum of structural units (a), structural units (b) and structural units (c) being at least 80% by weight based on the weight of the total structural units of the polymer.

By the term "monoethylenically aromatic hydrocarbon monomer" used herein, we mean a monoethylenically unsaturated hydrocarbon monomer having an aromatic ring. As specific examples of the monoethylenically aromatic hydrocarbon monomer, there can be mentioned styrene, o-, m- and p-methylstyrene, 2,4-dimethylstyrene, o-, m- and p-ethylstyrene, and vinyl naphthalene. By the phrase "substantially free from structural units derived from a monoethylenically aromatic hydrocarbon monomer" used herein, we mean that the amount of structural units derived from a monoethylenically aromatic hydrocarbon monomer is not larger than 5% by weight, preferably not larger than 2% by weight, and most preferably not larger than 1% by weight, based on the weight of the total structural units of polymer.

The ratio of structural units (a)/[structural units (b) plus structural units (c)] in the polymer particles used in the present invention is in the range of 99/1 to 60/40 by weight, preferably 99/1 to 65/35 by weight, and more preferably 98/2 to 70/30 by weight, provided that the sum of structural units (a), structural units (b) and structural units (c) is 100. The sum of structural units (a), structural units (b) and structural units (c) is at least 80% by weight, preferably at least 90% by weight based on the weight of the total structural units of polymer. When the structural units of the polymer satisfy the above-mentioned requirements, good battery performance is manifested even at a high temperature.

Further, the polymer is preferably substantially free from structural units derived from a nitrile group-containing monomer in view of stabilized characteristics at repetition of charge-discharge cycles at a high temperature. By the phrase "substantially free from structural units derived from a nitrile group-containing monomer" used herein we mean that the amount of the structural units is similar to the above-described amount of a monoethylenically aromatic hydrocarbon monomer. The nitrile group-containing monomer includes, for example, nitrile group-containing monoethylenically unsaturated monomers such as acrylonitrile and methacrylonitrile.

The monoethylenically unsaturated carboxylic acid ester monomer giving structural units (a) includes, for example, monoethylenically unsaturated monocarboxylic acid ester monomers having an alkyl group or a substituted alkyl group in the alcohol residue, such as an acrylic acid ester, a methacrylic acid ester and a crotonic acid ester. As specific examples of the monoethylenically unsaturated monocarboxylic acid alkyl or substituted alkyl ester monomers, there can be mentioned acrylic acid esters such as methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethylhexyl acrylate, hydrocypropyl acrylate and lauryl acrylate; methacrylic acid esters such as methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, hydroxypropyl methacrylate and lauryl methacrylate; crotonic acid esters such as methyl crotonate, ethyl crotonate, propyl crotonate, butyl crotonate, isobutyl crotonate, n-amyl crotonate, isoamyl crotonate, n-hexyl crotonate, 2-ethylhexyl crotonate and hydroxypropyl crotonate; amino group-containing methacrylic acid esters such as dimethylaminoethyl methacrylate and diethylaminoethyl methacrylate. Acrylic acid esters and methacrylic acid esters, which have a substituted alkyl group with a substituent such as a phosphoric acid residue, a sulfonic acid residue or a boric acid residue, in the alcohol residue can also be mentioned. Of these monoethylenically unsaturated monocarboxylic acid ester monomers, acrylic acid esters and methacrylic acid esters, which have an alkyl group with 1 to 12 carbon atoms, preferably 2 to 8 carbon atoms can be mentioned as especially preferable examples.

The monoethylenically unsaturated carboxylic acid monomer giving structural units (b) includes, for example, unsaturated monocarboxylic acid monomers such as acrylic acid, methacrylic acid, crotonic acid and isocrotonic acid; and unsaturated dicarboxylic acid monomers such as maleic acid, fumaric acid, citraconic acid, mesaconic acid, glutaconic acid and itaconic acid, and their acid anhydrides. Of these, monoethylenically unsaturated monocarboxylic acids such as acrylic acid and methacrylic acid are preferable.

The conjugated diene monomer giving structural units (c) includes, for example, 1,3-butadiene, 1,3-pentadiene, isoprene, 1,3-hexadiene, 2,4-hexadiene, 2,3-dimethyl-1,3-butadiene, 2-ethyl-1,3-butadiene and 1,3-heptadiene.

The above-mentioned monoethylenically unsaturated carboxylic acid ester monomers, monoethylenically unsaturated carboxylic acid monomers and conjugated diene monomers may be used either alone or as a combination of at least two thereof.

The polymer particles used in the present invention may comprise either structural units (b) or structural units (c), or both of structural units (b) and structural units (c). Preferably the polymers particles comprises both of structural units (b) and structural units (c) in a proportion of 1/99 to 99/1 by weight, more preferably 10/90 to 90/10 by weight and especially preferably 30/70 to 80/20 by weight, because of enhanced bonding properties.

Of the above-mentioned polymer particles, especially preferable are polymer particles comprising (d) structural units derived from a polyfunctional ethylenically unsaturated monomer [which structural units are hereinafter abbreviated to "structural units (d)"], in addition to structural units (a), structural units (b) and structural units (c). The polyfunctional ethylenically unsaturated monomer giving structural units (d) includes crosslinking monomers, for example, divinyl compounds such as divinylbenzene; dimethacrylic acid esters such as diethylene glycol dimethacrylate and ethylene glycol dimethacrylate; trimethacrylic acid esters such as trimethylolpropane trimethacrylate; diacrylic acid esters such as polyethylene glycol diacrylate and 1,3-butylene glycol diacrylate; triacrylic acid esters such as trimethylolpropane triacrylate. The amount of structural units (d) in the polymer particles is not larger than 20% by weight, preferably not larger than 15% by weight and more preferably not larger than 10% by weight, based on the weight of the total structural units. Especially when structural units (d) are contained in this amount and of at least 0.1% by weight, preferably at least 0.5% by weight and more preferably at least 1% by weight, stabilized characteristics at repetition of charge-discharge cycles at a high temperature can be obtained.

The polymer particles may further comprise structural units derived from other monoethylenically unsaturated compound, in addition to the above-mentioned structural units. The amount of such structural units is not larger than 15% by weight, preferably not larger than 10% by weight and more preferably not larger than 5% by weight, based on the weight of the total structural units.

Specific examples of the copolymers constituting the polymer particles used in the present invention will be recited below. These copolymers may be either uncrosslinked or crosslinked. However, the copolymers are preferably crosslinked polymers in view of good resistance to an electrolyte solution.

a 2-ethylhexyl acrylate/acrylic acid copolymer, a 2-ethylhexyl acrylate/ethyl acrylate/acrylic acid copolymer, a butyl acrylate/acrylic acid copolymer, a 2-ethylhexyl methacrylate/acrylic acid copolymer, a 2-ethylhexyl acrylate/acrylic acid/ethylene glycol dimethacrylate copolymer, a 2-ethylhexyl acrylate/hydroxypropyl acrylate/ acrylic acid copolymer, a diethylaminoethyl acrylate/acrylic acid copolymer, a methoxypolyethylene glycol monomethacrylate/acrylic acid copolymer, a 2-ethylhexyl crotonate/acrylic acid copolymer, a 2-ethylhexyl acrylate/ ethyl crotonate/acrylic acid copolymer, a 2-ethylhexyl acrylate/ethyl acrylate/acrylic acid/polyethylene glycol diacrylate copolymer, a butyl acrylate/acrylic acid/ divinylbenzene copolymer, a 2-ethylhexyl acrylate/acrylic acid/methacrylic acid copolymer, a 2-ethylhexyl acrylate/ acrylic acid/maleic acid copolymer, a 2-ethylhexyl acrylate/ itaconic acid copolymer, a 2-ethylhexyl methacrylate/acrylic acid/methacylic acid copolymer, a 2-ethylhexyl methacylate/acrylic acid/maleic acid copolymer, a 2-ethylhexyl methacrylate/itaconic acid copolymer, a 2-ethylhexyl acrylate/methacrylic acid copolymer, a 2-ethylhexyl acrylate/hexyl methacrylate/methacrylic acid copolymer, a butyl acrylate/methacrylic acid copolymer, a 2-ethylhexyl acrylate/methacrylic acid/ethylene glycol dimethacrylate copolymer, a 2-ethylhexyl methacrylate/ hydroxypropyl acrylate/acrylic acid copolymer, a diethylaminoethyl acrylate/methacrylic acid copolymer, a methoxypolyethylene glycol monomethacrylate/methacrylic acid copolymer, a 2-ethylhexyl crotonate/methacrylic acid copolymer, a 2-ethylhexyl acrylate/ethyl crotonate/ methacrylic acid copolymer, a 2-ethylhexyl methacrylate/ ethyl acrylate/methacrylic acid/polyethylene glycol diacrylate copolymer, a butyl acrylate/methacrylic acid/ divinylbenzene copolymer, a 2-ethylhexyl acrylate/crotonic acid copolymer, a 2-ethylhexyl acrylate/ethyl acrylate/ crotonic acid copolymer, a butyl acrylate/crotonic acid copolymer, a 2-ethylhexyl methacrylate/crotonic acid copolymer, a 2-ethylhexyl acrylate/crotonic acid/ethylene glycol dimethacrylate copolymer, a 2-ethylhexyl acrylate/ hydroxypropyl acrylate/crotonic acid copolymer, a diethylaminoethyl acrylate/crotonic acid copolymer, a methoxypolyethylene glycol monomethacrylate/crotonic acid copolymer, a 2-ethylhexyl crotonate/crotonic acid copolymer, a 2-ethylhexyl acrylate/ethyl crotonate/crotonic acid copolymer, a 2-ethylhexyl acrylate/ethyl acrylate/ crotonic acid/polyethylene glycol diacrylate copolymer, a butyl acrylate/crotonic acid/trimethylolpropane triacrylate copolymer, a 2-ethylhexyl acrylate/ maleic acid copolymer, a 2-ethylhexyl acrylate/ethyl methacrylate/maleic acid copolymer, a butyl acrylate/maleic acid copolymer, a 2-ethylhexyl acrylate/1,3-butadiene copolymer, a 2-ethylhexyl acrylate/ethyl acrylate/1,3-butadiene copolymer, a butyl acrylate/1,3-butadiene copolymer, a 2-ethylhexyl methacrylate/1,3-butadiene copolymer, a 2-ethylhexyl acrylate/1,3-butadiene/ethylene glycol dimethacrylate copolymer, a 2-ethylhexyl acrylate/ hydroxypropyl acrylate/1,3-butadiene copolymer, a diethylaminoethyl acrylate/1,3-butadiene copolymer, a methoxypropylethylene glycol monomethacrylate/1,3-butadiene copolymer, a 2-ethylhexyl crotonate/1,3-butadiene copolymer, a 2-ethylhexyl acrylate/ethyl crotonate/1,3-butadiene copolymer, a 2-ethylhexyl acrylate/ethyl acrylate/ 1,3-butadiene/polyethylene glycol diacrylate copolymer, a butyl acrylate/1,3-butadiene/divinylbenzene copolymer, a 2-ethylhexyl acrylate/1,3-butadiene/methacrylic acid copolymer, a 2-ethylhexyl acrylate/1,3-butadiene/maleic acid copolymer, a 2-ethylhexyl methacrylate/acrylic acid/1, 3-butadiene copolymer, a 2-ethylhexyl methacrylate/1,3-butadiene/maleic acid copolymer, a 2-ethylhexyl acrylate/ isoprene copolymer, a 2-ethylhexyl acrylate/ethyl methacrylate/isoprene copolymer, a butyl acrylate/isoprene copolymer, a 2-ethylhexyl acrylate/isoprene/ethylene glycol dimethacrylate copolymer, a 2-ethylhexyl, methacrylate/hydroxypropyl acrylate/isoprene copolymer, a diethylaminoethyl acrylate/isoprene copolymer, a methoxypolyethylene glycol monomethacrylate/isoprene copolymer, a 2-ethylhexyl crotonate/isoprene copolymer, a 2-ethylhexyl acrylate/ethyl crotonate/isoprene copolymer, a 2-ethylhexyl methacrylate/ethyl acrylate/isoprene/polyethylene glycol diacrylate copolymer, a butyl acrylate/isoprene/divinylbenzene copolymer, a 2-ethylhexyl acrylate/acrylic acid/1,3-butadiene copolymer, a 2-ethylhexyl acrylate/ethyl acrylate/acrylic acid/1,3-butadiene copolymer, a butyl acrylate/acrylic acid/1,3-butadiene copolymer, a 2-ethylhexyl methacrylate/acrylic acid/isoprene copolymer, a 2-ethylhexyl acrylate/acrylic acid/ethylene glycol methacrylate/isoprene copolymer, a 2-ethylhexyl acrylate/hydroxypropyl acrylate/acrylic acid/1,3-butadiene copolymer, a diethylaminoethyl acrylate/acrylic acid/1,3-butadiene copolymer, a methoxypolyethylene glycol monomethacrylate/acrylic acid/1,3-butadiene copolymer, a 2-ethylhexyl crotonate/acrylic acid/isoprene copolymer, a 2-ethylhexyl acrylate/ethyl crotonate/acrylic acid/1,3-butadiene copolymer, a 2-ethylhexyl acrylate/ethyl acrylate/acrylic acid/polyethylene glycol diacrylate/1,3-butadiene copolymer, a butyl acrylate/acrylic acid/divinylbenzene/1,3-butadiene copolymer, a 2-ethylhexyl acrylate/acrylic acid/methacrylic acid/isoprene copolymer, a 2-ethylhexyl acrylate/acrylic acid/maleic acid/isoprene copolymer, a 2-ethylhexyl acrylate/itaconic acid/1,3-butadiene copolymer, a 2-ethylhexyl methacrylate/acrylic acid/methacrylic acid/1,3-butadiene copolymer, a 2-ethylhexyl methacrylate/acrylic acid/maleic acid/1,3-butadiene copolymer, a 2-ethylhexyl methacrylate/acrylic acid/itaconic acid/1,3-butadiene copolymer, a 2-ethylhexyl acrylate/ethyl methacrylate/methacrylic acid/isoprene copolymer, a butyl acrylate/methacrylic acid/isoprene copolymer, a 2-ethylhexyl acrylate/methacrylic acid/ethylene glycol dimethacrylate/1,3-butadiene copolymer, a 2-ethylhexyl methacrylate/hydroxypropyl acrylate/acrylic acid/1,3-butadiene copolymer, a diethylaminoethyl acrylate/methacrylic acid/isoprene copolymer, a methoxypolyethylene glycol monomethacrylate/methacrylic acid/1,3-butadiene copolymer, a 2-ethylhexyl crotonate/methacrylic acid/1,3-butadiene copolymer, a 2-ethylhexyl acrylate/ethyl crotonate/methacrylic acid/1,3-butadiene copolymer, a 2-ethylhexyl methacrylate/ethyl acrylate/methacrylic acid/polyethylene glycol diacrylate/1,3-butadiene copolymer, a butyl acrylate/methacrylic acid/divinylbenzene/isoprene copolymer, a 2-ethylhexyl acrylate/crotonic acid/isoprene copolymer, a 2-ethylhexyl acrylate/ethyl acrylate/crotonic acid/1,3-butadiene copolymer, a butyl acrylate/crotonic acid/1,3-butadiene copolymer, a 2-ethylhexyl methacrylate/crotonic acid/isoprene copolymer, a 2-ethylhexyl acrylate/crotonic acid/ethylene glycol dimethacrylate/1,3-butadiene copolymer, a 2-ethylhexyl acrylate/hydroxypropyl acrylate/crotonic acid/isoprene copolymer, a diethylaminoethyl acrylate/crotonic acid/1,3-butadiene copolymer, a methoxypolyethylene glycol monomethacrylate/crotonic acid/isoprene copolymer, a 2-ethylhexyl crotonate/crotonic acid/1,3-butadiene copolymer, a 2-ethylhexyl acrylate/ethyl crotonate/crotonic acid/isoprene copolymer, a 2-ethylhexyl acrylate/ethyl acrylate/crotonic acid/polyethylene glycol diacrylate/1,3-butadiene copolymer, a butyl acrylate/crotonic acid/trimethylolpropane triacrylate/isoprene copolymer, a 2-ethylhexyl acrylate/ethyl methacrylate/maleic acid/1,3-butadiene copolymer, a butyl acrylate/maleic acid/1,3-butadiene copolymer, a 2-ethylhexyl acrylate/itaconic acid/isoprene copolymer, a 2-ethylhexyl acrylate/1,3-pentadiene copolymer, a 2-ethylhexyl acrylate/ethyl methacrylate/1,3-pentadiene copolymer, a butyl acrylate/isoprene copolymer, a 2-ethylhexyl acrylate/ethyl crotonate/1,3-pentadiene copolymer, a 2-ethylhexyl methacrylate/ethyl acrylate/1,3-pentadiene/polyethylene glycol diacrylate, a butyl acrylate/1,3-pentadiene/divinylbenzene copolymer, a 2-ethylhexyl acrylate/acrylic acid/1,3-pentadiene copolymer, a 2-ethylhexyl acrylate/ethyl acrylate/acrylic acid/1,3-pentadiene copolymer, a butyl acrylate/acrylic acid/1,3-pentadiene copolymer, a 2-ethylhexyl methacrylate/acrylic acid/1,3-pentadiene copolymer, a 2-ethylhexyl acrylate/acrylic acid/ethylene glycol dimethacrylate/1,3-pentadiene copolymer, a 2-ethylhexyl acrylate/hydroxypropyl acrylate/acrylic acid/1,3-pentadiene copolymer, a diethylaminoethyl acrylate/acrylic acid/1,3-pentadiene copolymer, a methoxypolyethylene glycol monomethacrylate/acrylic acid/1,3-pentadiene copolymer, a 2-ethylhexyl crotonate/acrylic acid/1,3-pentadiene copolymer, a 2-ethylhexyl acrylate/ethyl crotonate/acrylic acid/1,3-pentadiene copolymer, a 2-ethylhexyl acrylate/ethyl acrylate/acrylic acid/polyethylene glycol diacrylate/1,3-butadiene/1,3-pentadiene copolymer, a butyl acrylate/acrylic acid/divinylbenzene/1,3-butadiene/1,3-pentadiene copolymer, a 2-ethylhexyl acrylate/acrylic acid/methacrylic acid/1,3-pentadiene copolymer, a 2-ethylhexyl acrylate/acrylic acid/maleic acid/1,3-pentadiene copolymer, a 2-ethylhexyl acrylate/itaconic acid/1,3-pentadiene copolymer, a 2-ethylhexyl methacrylate/acrylic acid/methacrylic acid/1,3-butadiene/1,3-pentadiene copolymer, a 2-ethylhexyl methacrylate/acrylic acid/maleic acid/1,3-pentadiene copolymer, and a 2-ethylhexyl methacrylate/itaconic acid/isoprene/1,3-pentadiene copolymer.

The binder composition of the present invention is a liquid dispersion of the above-mentioned polymer in the form of particles, dispersed in a specific organic liquid dispersion medium. The method for preparing the liquid dispersion is not particularly limited, but, in view of enhanced production efficiency, preferable is a method wherein a latex comprising polymer particles dispersed in an aqueous medium is prepared by a conventional procedure, and thereafter, water contained in the latex is substituted with an organic liquid dispersion medium. The manner in which water is substituted with an organic liquid dispersion medium, includes those in which a latex having incorporated therein an organic liquid dispersion medium is subjected to a distillation method, a fractional filtration method, or a method of phase reversal of dispersion medium, to remove water. Preferably water is removed to an extent such that the residual water is not larger than 3% by weight, preferably not larger than 1% by weight, and more preferably not larger than 0.5% by weight, to attain an excellent effect of enhancing the initial battery capacity. The mechanism therefor is not clearly elucidated, but, it is presumed that water remaining in a slurry used for preparation of an electrode for battery tends to retard drying of a coating of the slurry formed on a collector at the step of preparation of the electrode.

The procedure for preparing latex of the polymer is not particularly limited, and includes an emulsion polymerization procedure and a suspension polymerization procedure. For example, a latex, i.e., an aqueous dispersion of polymer particles in water, can be prepared by a method described in Jikken Kagaku Kouza, Vol. 28, edited by Nihon Kagakukai [Japanese Chemical Society] and published by Maruzen K.K.), namely, a method wherein a closed vessel provided with a stirrer and a heating means is charged with an initiator, monomers, water, a dispersing agent, an emulsifying agent, a crosslinking agent and other additives to prepare a monomer charge having a predetermined composition; the monomer charge is stirred whereby the monomers are emulsified or dispersed in water; and the temperature is elevated while the monomer charge is stirred, to initiated a polymerization. Alternatively, the binder composition of the present invention can be directly produced by a dispersion polymerization method using an organic liquid dispersion medium.

The emulsifier and the dispersing agent can be chosen from those which are conventionally used in an emulsion polymerization method, a suspension polymerization method and a dispersion polymerization method. As specific examples of the emulsifier and the dispersing agent, there can be mentioned benzenesulfonate salts such as sodium dodecylbenzenesulfonate and sodium dodecyl-phenyl-ether-sulfonate; alkylsulfate salts such as sodium laurylsulfate, sodium tetradodecylsulfate and a formaldehyde condensate of sodium alkylnaphthalenesulfonate; sulfosuccinate salts such as sodium dioctylsulfosuccinate and sodium dihexyl-sulfosuccinate; fatty acid salts such as sodium laurate; ethoxysulfate salts such as sodium polyoxyethylene-lauryl-ether-sulfate and sodium polyoxyethylene-nonyl-phenyl-ether-sulfate; alkanesulfonate salts; sodium alkyl-ether-phosphate ester; and nonionic emulsifiers such as polyoxyethylene nonyl phenyl ether, polyoxyethylene sorbitan lauryl ester and polyoxyethylene-polyoxypropylene block copolymer. These emulsifiers and dispersing agents can be used either alone or as a combination of at least two thereof. The amount of the emulsifier and the dispersing agent can be freely chosen, but is usually in the range of about 0.01 to 10 parts by weight based on 100 parts by weight of the total monomers. Depending upon the polymerization conditions, the polymerization can be conducted without the dispersing agent.

Additives such as a molecular weight modifier can be used. As specific examples of the molecular weight modifier, there can be mentioned mercaptans such as t-dodecyl mercaptan, n-dodecyl mercaptan and n-octyl mercaptan; and halogenated hydrocarbons such as carbon tetrachloride and carbon tetrabromide. These molecular weight modifiers can be added to the polymerization system before or during the polymerization. The amount of the molecular weight modifier is usually in the range of 0.01 to 10 parts by weight, preferably 0.1 to 5 parts by weight, based on 100 parts by weight of the monomers.

The polymerization initiator is chosen from those which are used in ordinary emulsion polymerization, dispersion polymerization and suspension polymerization. The polymerization initiator includes, for example, persulfate salts such as potassium persulfate and ammonium persulfate; hydrogen peroxide; and organic peroxide such as benzoyl peroxide and cumene hydroperoxide. These initiators may be used either alone, or as a redox polymerization initiator which is a combination thereof with a reducing agent such as sodium acid sulfate, sodium thiosulfate and ascorbic acid.

The polymerization initiator further includes, for example, azo compounds such as 2,2'-azobisisobutyronitrile, 2,2'-azobis(2,4-dimethylvaleronitrile), 2,2'-azobis(4-methoxy-2,4-dimethylvaleronitrile) and 4,4'-azobis(4-cyanopentanoic acid; and amidine compounds such as 2,2'-azobis(2-aminodipropane)dihydrochloride, 2,2'-azobis(N,N'-dimethyleneisobutylamidine) and 2,2'-azobis(N,N'-dimethyleneisobutylamidine) dihydrochloride. These initiators may be used either alone, or as a combination of at least two thereof.

The amount of the polymerization initiator is in the range of 0.01 to 10 parts by weight, preferably 0.1 to 5 parts by weight, based on the total weight of the monomers.

The polymerization temperature and the polymerization time can be appropriately chosen depending upon the particular procedure for polymerization and the kind of polymerization initiator, but, are usually in the range of about 30 to 200° C. and about 0.5 to 30 hours, respectively. A polymerization aid such as an amine can be used.

To a latex produced by the above-mentioned polymerization procedures, a basic aqueous solution can be added to adjust the pH value of 5 to 10, preferably 5 to 9. The basic aqueous solution is an aqueous solution of a base, for example, a hydroxide of an alkali metal such as Li, Na, K, Rb or Cs; ammonia; an inorganic ammonium compound such as $NH_4Cl$; an organic amine compound such as ethanolamine or diethylamine. Of these bases, an alkali metal hydroxide is preferable because a bonding force (peel strength) between a collector and an active material can be enhanced.

The pH value is measured under the following conditions.
(i) Apparatus: HM-12P available from Toa Dempa Kogyo K.K.
(ii) Measurement temperature: 25° C.
(iii) Amount of liquid tested: 100 ml A pH meter is turned on and maintained as it is for about 30 minutes to be thereby stabilized. The area to be detected is washed with pure water at least three times, and wiped with clean sanitary cotton. Calibration of standard solution is conducted by single-point calibration. An electrode is dipped in a standard neutral phosphate salt solution having a pH value of 6.86, and then the solution is shaken two or three times to remove bubbles. The solution is left to stand for 10 minutes, and then, the measured value is read and then is calibrated. After the calibration, the electrode is washed with pure water at least three times and then wiped with sanitary clean cotton. Thereafter the electrode is dipped in the liquid to be tested, and shaken twice or three times to remove bubbles. The liquid is then left to stand for 10 minutes and reading of the pH value is made.

The organic liquid dispersion medium in which the above-mentioned polymer particles are dispersed has a boiling point in the range of 80 to 350° C., preferably 100 to 300° C. and more preferably 120 to 280° C. at normal pressure. As specific examples of the organic liquid dispersion medium, there can be mentioned the following substances. Numeral within each parenthesis denotes a boiling point (unit: ° C.) at normal pressure as expressed by counting fractions of 0.5 and over as a whole number and disregarding the rest. When the boiling point falls within a certain range, it was confirmed that the lower limit is 80° C. or higher, and the upper limit is denoted in parenthesis.

Hydrocarbons: heptane (98), n-octane (125), isooctane (117), n-nonane (150), decane (174), decaline (194), α-pinene (156), β-pinene (163), δ-pipene (161), 1-chlorooctane (182), 1,2-dichloroethane (83), chlorodecane (223), tetrachloroethylene (121), cyclohexane (81), cycloheptane (118), methylcyclopentane (101), chlorocyclohexane (144), cyclohexene (83), cycloheptene (115), benzene (80), toluene (111), o-xylene (144), m-xylene (139), p-xylene (138), styrene (145), chlorobenzene (132), o-chlorotoluene (159), m-chlorotoluene (162), p-chlorotoluene (162), ethylbenzene (136), propylbenzene (159), diisopropylbenzene (231), butylbenzene (183), isobutylbenzene (173), n-amylbenzene (202), and cumene (152);

Alcohols: 1-propanol (97), 2-propanol (82), 1-butanol (117), t-butanol (83), 1-pentanol (138), 2-pentanol (119), 3-pentanol (116), 1-hexanol (157), 2-hexanol (139), 3-hexanol (135), 1-octanol (195), 2-octanol (179), benzyl alcohol (205), 4-t-butylcatechol (285), cyclopentanol (141), glycerin (290);

Ketones: methyl ethyl ketone (80), 2-pentanone (102), 2-hexanone (127), 3-hexanone (125), cyclopentanone (131), cyclohexanone (156), cycloheptanone (180), 2,6-dimethyl-4-heptanone (168), and isophrone (215);

Ethers: propyl ether (91), butyl ether (142), isobutyl ether (123), n-amyl ether (188), isoamy ether (173), methyl n-amyl ether (100), ethyl butyl ether (92), ethyl isobutyl ether (81), ethyl n-amyl ether (120), ethyl isoamyl ether (112), phenetole (170), 1,3-dioxane (106) and 1,4-dioxane (101);

Esters: Propyl formate (82), butyl formate (107), pentyl formate (132), isopropyl acetate (89), n-propyl acetate (101), n-butyl acetate (126), s-butyl acetate (112), t-butyl acetate (98), methyl lactate (144), ethyl lactate (154), butyl lactate (187), methyl benzoate (200) and ethyl benzoate (213);

Amines: o-toluidine (200), m-toluidine (203), p-toluidine (200), N,N-dimethylaniline (194) and piperidine (105);

Amides: N,N-dimethylformamide (153), N-methylpyrrolidone (202) and N,N-dimethylacetamide (194);

Sulfur-containing compounds: diemthylsulfoxide (189);

Nitrile group-containing compounds: lactonitrile (184), ethylene cyanohydrin (220) and adiponitrile (295);

Oxygen-containing heterocyclic compounds: furfural (162);

Nitrogen-containing heterocyclic compounds: pyridine (116), pyrrole (130) and pyrrolidine (88);

Cellosolve acetates: ethylcellosolve acetate (192);

Glycols: ethylene glycol (198), diethylene glycol (186) and propylene glycol (188);

Ethylene glycol alkyl ethers: diethylene glycol monoethyl ether (195), diethylene glycol dimethyl ether (159), diethylene glycol monobutyl ether (230) and triethylene glycol dimethyl ether (222);

Lactones: γ-butyrolactone (206), γ-valerolactone (207) and γ-caprolactone (216); and Lactams: β-butyrolactam (245) and δ-valerolactam (256).

The polymer particles having structural units (a) and structural units (b) and/or (c), used in the present invention, may be either particles composed of one kind of polymer, or composite particles composed of two or more kinds of polymers, provided that the polymer particles are produced form a monomer composition satisfying the above requirements. More specifically the composite particles can be produced, for example, by a two-stage polymerization process wherein one or more kinds of monomers are polymerized by an ordinary procedure and subsequently other kind of monomer or monomers are added and polymerized by an ordinary procedure.

The composite particles have an odd-shaped structure which includes, for example, a core-shell type structure, an islands-in-sea type structure, a side-by-side type structure, a tumbler type structure, an octopus ocellus type structure and a raspberry type structure, which are called in the field of latexes and described in "Setchaku (Adhesion)" vol. 34, No. 1, p13–23, especially illustrated in FIG. 6 on page 17.

It is important that the polymer particles in the binder composition of the present invention are insoluble or only slightly soluble in an electrolyte solution. Thus, the polymer particles preferably have a gel content, as calculated as insoluble matter in an electrolyte solution, of 50% to 100% by weight, more preferably 60% to 100% by weight, and especially preferably 70% to 100% by weight. The gel content (hereinafter referred to as "gel content G1") used herein means that as calculated as insoluble matter in an electrolyte solution, which is a one mole/liter solution of $LiPF_6$ in a mixed liquid comprised of propylene carbonate/ethylene carbonate/diethyl carbonate/dimethyl carbonate/methylethyl carbonate at a ratio of 20/20/20/20/20 by volume at 20° C.

The gel content G1 is determined as follows. A glass plate is coated with a polymer binder composition to form a filmy coating having a thickness of about 0.1 mm. The filmy coating is air-dried at 120° C. for 24 hours and further vacuum-dried at 120° C. for 2 hours. The dry film is weighed (weight: D1) and then is dipped in the above-mentioned electrolyte solution in an amount of 100 times by weight of the film at 70° C. for 74 hours. Then, the dipped film is filtered through a wire mesh sieve with a 200 mesh size. The insoluble matter remaining on the sieve is vacuum-dried at 120° C. for 24 hours and then weighed (weight: D2). The gel content G1 is calculated according to the equation:

$$\text{Gel content } G1(\%)=(D2/D1)\times 100$$

It is also important that the polymer is present in the form of particles in the binder composition. The presence of the polymer particles can be confirmed by the transmission electron microscopy. Thus, the polymer particles preferably have a gel content, as calculated as insoluble matter in an organic liquid dispersion medium, of 50% to 100% by weight, more preferably 60% to 100% by weight, and especially preferably 70% to 100% by weight, in view of the characteristics at repetition of charge-discharge cycles at a high temperature of 60° C., and initial service capacity at a high temperature of 60° C. The gel content (hereinafter referred to as "gel content G2") used herein means that as calculated as insoluble matter in the organic liquid dispersion medium contained in the polymer binder composition.

The gel content G2 is determined as follows. Weight D1 of the polymer film is measured by the same procedure as described in the above method of calculating gel content G1. The film is dipped in an organic liquid dispersion medium (the same as that used for the preparation of the binder composition) in an amount of 100 times by weight of the film at 30° C. for 24 hours. Then, the dipped film is filtered through a wire mesh sieve with a 200 mesh size. The insoluble matter remaining on the sieve is vacuum-dried at 120° C. for 24 hours and then weighed (weight: D3). The gel content G2 is calculated according to the equation:

$$\text{Gel content } G2\ (\%)=(D3/D1)\times 100$$

Additives such as a viscosity modifier and a fluidizing agent can be added in the binder composition of the present invention to improve coating fluid properties of a slurry for an electrode for a secondary battery, hereinafter described. As specific examples of the additives, there can be mentioned cellulosic polymeric materials such as carboxymethyl cellulose, methyl cellulose and hydroxypropyl cellulose, and ammonium salts and alkali metal salts of these cellulosic polymeric materials; polyacrylic acid salts such as sodium polyacrylate; polyvinyl alcohol, polyethylene oxide, polyvinyl pyrrolidone, a copolymer of acrylic acid or its salt with vinyl alcohol, a copolymer of maleic anhydride, maleic acid or fumaric acid with vinyl alcohol, modified polyvinyl alcohol, modified polyacrylic acid, polyethylene glycol, polycarboxylic acid, an ethylene-vinyl alcohol copolymer, a vinyl acetate polymer, and other water-soluble polymers. The amount of these additives can be appropriately chosen according to the need.

The binder composition of the present invention may contain polymers (hereinafter referred to as "other polymers") other than the above-mentioned polymers, which may be either dissolved in the organic liquid medium, or dispersed in the form of particles. The amount of such other polymers is preferably not larger than 5 part by weight based on 1 part of the polymer particles.

(2) Slurry for Electrode for Secondary Battery

The slurry of the present invention is prepared by incorporating an active material and additives, which are described below, in the binder composition of the present invention.

Active Material

The active material is not particularly limited provided that it is used for ordinary lithium ion secondary batteries.

As specific examples of the active material for a negative electrode, there can be mentioned carbonaceous materials such as amorphous carbon, graphite, natural graphite, MCMB, and pitch carbon fiber, electrically conductive polymers such as polyacene, and composite metal oxides represented by the formula $A_xM_yO_z$ wherein A is an alkali metal or a transition metal, M is at least one transition metal selected from Co, Ni, Al, Sn and Mn, O is an oxygen atom, x, y and z represent numbers satisfying the formulae: $1.10 \geq x \geq 0.05$, $4.00 \geq y \geq 0.85$, and $5.00 \geq z \geq 1.5$, and other metal oxides.

The active material used for a positive electrode is not particularly limited provided that it is used for ordinary lithium ion secondary battery. As specific examples of the active material for a positive electrode, there can be mentioned metal sulfides and metal oxides such as $TiS_2$, $TiS_3$, amorphous $MoS_3$, $Cu_2V_2O_3$, amorphous $V_2O$-$P_2O_5$, $MoO_3$, $V_2O_5$ and $V_6O_{13}$; and lithium-containing composite metal oxides such as $LiCoO_2$, $LiNiO_2$, $LiMnO_2$ and $LiMn_2O_4$. The active material for a positive electrode further includes organic compounds including electrically conductive polymers such as polyacetylene and poly-p-phenylene.

The amount of an active material in the slurry for an electrode for a secondary battery is not particularly limited and is usually 1 to 1,000 times, preferably 2 to 500 times, more preferably 3 to 500 times and especially preferably 5 to 300 times, of the weight of the polymer particles (i.e., the solid content in the binder composition). When the amount of an active material is too small, an active material layer formed on a collector has a reduced activity and the electrode is liable to have poor performances. When the amount of an active material is too large, the adhesion of the active material to a collector becomes poor and the active material tends to be fallen from the collector. A liquid medium can be added to the slurry so that the concentration of an active material in the slurry be suitable for coating a collector with the slurry.

Additives

According to the need, additives such as a viscosity modifier and a fluidizing agent, which are hereinbefore mentioned as for the binder composition of the present invention, can be incorporated in the slurry. Further, electrically conductive materials including carbon such as graphite and active carbon, and a metal powder, can be incorporated in the slurry provided that the object of the invention can be achieved.

(3) Electrode for Lithium Ion Secondary Battery

The electrode of the present invention for a lithium ion secondary battery is made by coating a collector such as a metal foil with the above-mentioned slurry of the present invention, and drying the coating to fix an active material on the collector. The electrode may be either a positive electrode or a negative electrode.

The collector used is not particularly limited provided that it is composed of an electrically conductive material. The collector is usually composed of metal such as iron, copper, aluminum, nickel or stainless steel. The shape of the collector is also not particularly limited, and the collector is usually used in a sheet form having a thickness of about 0.001 mm to 0.5 mm.

The procedure of coating the collector with the slurry is not particularly limited. The collector can be coated with the above-mentioned slurry by a conventional coating procedure such as doctor-blade coating, dip coating, reverse-roll coating, direct-roll coating, gravure coating, extrusion coating and brush coating. The amount of the slurry applied is not particularly limited, and is usually such that the thickness of the dried coating formed on the collector has a thickness of about 0.005 mm to 5 mm, preferably about 0.1 mm to 2 mm. The procedure for drying an as-formed coating is not particularly limited, and includes, for example, warm-air drying, hot-air drying, low-humid-air drying, vacuum drying, infrared drying, far-infrared drying, electron radiation drying. The drying conditions should be chosen so that the liquid medium used is removed as soon as possible provided that occurrence of stress crack in the active material layer due to stress concentration, and separation of the active material layer from the collector can be avoided.

The electrode can be pressed, if desired, to enhance the density of the active material layer. The pressing can be carried out by a conventional procedure, such as a mold pressing and a roll pressing.

(4) Lithium Ion Secondary Battery

The lithium ion secondary battery of the present invention comprises the above-mentioned electrode and an electrolyte solution, and a separator and other elements according to the need. The lithium ion secondary battery is fabricated by a conventional procedure. For example, a positive electrode and a negative electrode are superposed with a separator interposed between the two electrodes, and the thus-formed assembly is wound or folded and then inserted into a vessel. An electrolyte solution is introduced into the vessel, and the vessel is sealed. The shape of the secondary battery is not particularly limited, and is, for example, coin-shape, button-shape, sheet-shape, cylindrical shape, rectangular shape and flat shape.

The electrolyte solution is selected from those which are conventionally used for a lithium ion secondary battery. A suitable electrolyte solution can be chosen depending upon the particular active material used so as to obtain the desired battery performances.

The electrolyte of the secondary battery includes known lithium salts. As specific examples of the electrolyte, there can be mentioned $LiClO_4$, $LiBF_6$, $LiPF_6$, $LiCF_3$, $LiCF_3CO_2$, $LiAsF_6$, $LiSbF_6$, $LiB_{10}Cl_{10}$, $LiAlCl_4$, $LiCl$, $LiBr$, $Li/B(C_2H_5)_4$, $CF_3SO_3Li$, $CH_3SO_3Li$, $LiCF_3SO_3$, $LiC_4F_9SO_3$, $Li(CF_3SO_2)_2N$ and lithium salt of lower fatty acids.

The liquid medium used for dissolving the electrolyte is not particularly limited and includes conventional liquid mediums. As specific examples of the liquid medium, there can be mentioned carbonates such as propylene carbonate, ethylene carbonate, butylene carbonate, dimethyl carbonate and diethyl carbonate; lactones such as γ-butyrolactone; ethers such as trimethoxymethane, 1,2-dimethoxyethane, diethyl ether, 2-ethoxyethane, tetrahydrofuran and 2-methyltetrahydrofuran; sulfoxide such as dimethylsulfoxide; oxolanes such as 1,3-dioxolane and 4-methyl-1,3-dioxolane; nitrogen-containing compound such as acetonitrile and nitromethane; organic acid esters such as methyl formate, methyl acetate, ethyl acetate, butyl acetate, methyl propionate and ethyl propionate; inorganic acid esters such as phosphoric acid triesters and carbonic acid diesters including dipropyl carbonate; diglymes; triglymes; sulfolanes; oxazolidinones such as 3-methyl-2-oxazolidinone; and sultones such as 1,3-propanesultone, 1,4-butanesultone and naphthasultone. These liquid mediums may be used either alone or as a mixed liquid comprised of at least two thereof.

The invention will now be described more specifically by the following working examples that by no means limit the scope of the invention.

In the working examples, parts and % are by weight unless otherwise specified.

Properties of electrodes and batteries were evaluated by the following methods.

(1) Bending of Electrode

An electrode is cut into a strip of 3 cm width×9 cm length. A stainless steel wire having a diameter of 1 mm is placed at the center of the strip (i.e., at a distance of 4.5 cm from the ends of the length) perpendicularly to the length of the strip. The strip is bent at an angle of 180° along the stainless steel wire, and the state of a film coating on the electrode at the bent portion is observed. This bending test is conducted on ten electrode specimens. The evaluation results are expressed by the following two ratings.

Rating A: crack formation in a film coating and peeling thereof are not observed at all on ten specimens.

Rating B: at least one crack occurring in a film coating or peeling thereof is observed on at least one of ten specimens.

(2) Peel Strength of Electrode

A strip specimen is cut from an electrode in the same manner as in the banding test (1). A self-adhesive tape ("Cellotape" available from Nichiban K.K., stipulated in JIS Z1522) is adhered to the strip specimen, and the strip specimen is fixed. The adhered strip is quickly peeled tape and a peel strength (g/cm) is measured. The measurement is conducted on 10 specimens and the results are expressed by the average value.

(3) Initial Service Capacity of Battery at High Temperature

Charge-discharge cycles of a battery is repeated at a high temperature in a manner described below. Initial service capacity is measured at the third cycle of the charge-discharge cycling test.

(4) Characteristics of Battery at Repetition of Charge-Discharge Cycles at High Temperature A coin-shaped secondary battery specimen is fabricated by the method described below. A negative electrode test is conducted at a voltage from 0 V to 1.2 V by using a lithium metal positive electrode (Examples 1–4 and Comparative Examples 1 and 2), and a positive electrode test is conducted at a voltage from 3 V to 4.2 V by using a lithium metal negative electrode (Examples 5–8 and Comparative Examples 3 and 4), at a temperature of 65° C. and at a constant current of 0.1 C. The retention of capacity at repetition of charge-discharge cycles is expressed by percentage of the ratio (A/B) of service capacity (A) (unit: mAh/g of active material) as measured at the 50th cycle to service capacity (B) (unit: mAh/g of active material) as measured at the third cycle. The larger the percentage of A/B, the smaller the capacity reduction at repetition of charge-discharge cycles.

Coin-shaped secondary battery is fabricated as follows. A positive electrode and a negative electrode, each having an active material layer formed by using a polymer binder for evaluation are prepared as follows. An aluminum foil collector having a thickness of 20 $\mu$m is uniformly coated with an active material-containing slurry for positive electrode by a doctor blade. A copper foil collector having a thickness of 18 $\mu$m is uniformly coated with an active material-containing slurry for negative electrode by a doctor blade. Each as-formed coating is dried at 120° C. for 15 minutes in a drier, and further vacuum-dried under 5 mmHg at 120° C. for 2 hours. The dried coated aluminum foil is preserved by a twin roll press so that the density of an active material is 3.2 g/cm$^3$ to prepare a positive electrode having an active material layer. The dried coated copper foil is pressed by a twin roll press so that the density of an active material is 1.3 g/cm$^3$ to prepare a negative electrode having an active material layer.

Each of the positive electrode and the negative electrode is cut into a circular shape having a diameter of 15 mm. A battery is fabricated by using the circular positive electrode or the circular negative electrode, a lithium metal counter electrode and a separator, which is sandwiched between the positive electrode or the negative electrode and the lithium metal counter electrode so that the active material layers of the two electrodes confront to each other. The separator is comprised of a circular porous polypropylene film having a diameter of 18 mm and a thickness of 25 $\mu$m. An assembly of the two electrodes and the separator is placed in a coin-shaped outer casing having a diameter of 20 mm and a height of 1.8 mm and made of a stainless steel sheet having a thickness of 0.25 mm, so that the aluminum foil of the positive electrode or lithium metal is kept in contact with the casing bottom. An expanded metal part is placed on the copper foil of the negative electrode or on lithium metal of the counter electrode. A polypropylene packing is packed within the casing. An electrolyte solution, which is a solution of LiPF$_6$ with a concentration of 1 mol/liter of a mixed liquid composed of propylene carbonate/ethylene carbonate/diethyl carbonate/dimethyl carbonate/methyl ethyl carbonate at a mixing ratio of 20/20/20/20/20 (volume ratio at 20° C.), is injected into the casing so that no air remains within the casing. The thus-fabricated assembly is covered with a stainless steel cap having a thickness of 0.2 mm via the polypropylene packing. The assembly-packed casing is sealed whereby a coin-shaped battery having a diameter of 20 mm and a thickness of about 2 mm is obtained.

EXAMPLE 1

A polymerization vessel was charged with 82 parts of 2-ethylhexyl acrylate, 5 parts of acrylic acid, 10 parts of butadiene, 3 parts of ethylene glycol dimethacrylate, 2 parts of sodium dodecylbenzenesulfonate, 0.3 part of potassium persulfate and 250 parts of water. Polymerization was conducted at 60° C. for 8 hours. Then the content was cooled to room temperature, and an aqueous 10% ammonium solution was added thereto to adjust the pH value to 6 whereby a pH-adjusted latex was obtained.

N-methylpyrrolidone (hereinafter abbreviated to "NMP" when appropriate) as an organic liquid dispersion medium was added to the pH-adjusted latex. The mixture was evaporated by an evaporator under a reduced pressure by using an aspirator at 80° C. in a water bath to a water content of 800 ppm, whereby a dispersion in NMP of polymer particles having a solid concentration of 13% was obtained.

The NMP dispersion containing 2 parts of polymer particles was mixed together with 2 parts of an ethylene-vinyl alcohol copolymer and 96 parts of natural graphite. Then NMP was added to the mixture and the resultant mixture was stirred to give a slurry having a solid content of 42%. A negative electrode was made by using the slurry and a battery was fabricated by the above-mentioned procedure. The gel content of polymer and properties of the negative electrode and battery were evaluated. The results are shown in Table 1.

EXAMPLE 2

By the same procedures as described in Example 1, polymerization was carried out wherein the monomers and polymerization conditions shown in Table 1 were adopted. After completion of the polymerization, an aqueous 5% lithium hydroxide solution was added to adjust the pH value to 7.

Using the thus-prepared pH-adjusted latex, a dispersion in NMP of polymer particles was prepared and a negative electrode was made by using the NMP dispersion, by the same procedures as described in Example 1. The gel content of polymer and properties of the negative electrode and battery were evaluated. The results are shown in Table 1.

EXAMPLE 3

By the same procedures as described in Example 1, polymerization was carried out wherein the monomers and polymerization conditions, shown in Table 1, were adopted. After the polymerization mixture was similarly cooled, an aqueous 5% sodium hydroxide solution was added to adjust the pH value to 7.

Using the thus-prepared pH-adjusted latex, a dispersion in NMP of polymer particles was prepared and a negative electrode was made by using the NMP dispersion, by the same procedures as described in Example 1. The gel content of polymer and properties of the negative electrode and battery were evaluated. The results are shown in Table 1.

EXAMPLE 4

By the same procedures as described in Example 1, polymerization was carried out wherein the monomers and polymerization conditions, shown in Table 1 were adopted. After the polymerization mixture was similarly cooled, an aqueous 5% potassium hydroxide solution was added to adjust the pH value to 8.

Using the thus-prepared pH-adjusted latex, a dispersion in NMP polymer particles was prepared and a negative electrode was made by using the NMP dispersion, by the same procedures as described in Example 1. The gel content of polymer and properties of the negative electrode and battery were evaluated. The results are shown in Table 1.

COMPARATIVE EXAMPLE 1

By the same procedures as described in Example 2, polymerization was carried out wherein the monomers and polymerization conditions, shown in Table 1 were adopted. After the polymerization mixture was similarly cooled, an aqueous 10% ammonia solution was added to adjust the pH value to 7.

Using the thus-prepared pH-adjusted latex, a dispersion in NMP of polymer particles was prepared and a negative electrode was made by using the NMP dispersion, by the same procedures as described in Example 1. The gel content of polymer and properties of the negative electrode and battery were evaluated. The results are shown in Table 1.

COMPARATIVE EXAMPLE 2

By the same procedures as described in Example 2, polymerization was carried out wherein the monomers and polymerization conditions, shown in Table 1 were adopted. After the polymerization mixture was similarly cooled, an aqueous 10% ammonia solution was added to adjust the pH value to 7.

Using the thus-prepared pH-adjusted latex, a dispersion in NMP of polymer particles was prepared and a negative electrode was made by using the NMP dispersion, by the same procedures as described in Example 1. The gel content of polymer and properties of the negative electrode and battery were evaluated. The results are shown in Table 1.

TABLE 1

|  | Example | | | | Com. Ex. | |
| --- | --- | --- | --- | --- | --- | --- |
|  | 1 | 2 | 3 | 4 | 1 | 2 |
| Polymer composition (parts) | | | | | | |
| Monomer for structural units (a) | | | | | | |
| 2-Ethylhexyl acrylate | 82 | 72 | — | — | 72 | 72 |
| Ethyl acrylate | — | 3 | — | — | 3 | 3 |
| Butyl acrylate | — | — | 70 | — | — | — |
| 2-Ethylhexyl methacrylate | — | — | — | 87 | — | — |
| Monomer for structural units (b) | | | | | | |
| Acrylic acid | 5 | — | 10 | — | — | — |
| Methacrylic acid | — | 25 | 15 | — | 25 | 25 |
| Monomer for structural units (c) | | | | | | |
| 1,3-Butadiene | 10 | — | 5 | 2 | — | 35 |
| Monomer for structural units (d) | | | | | | |
| Ethylene glycol dimethacrylate | 3 | — | — | — | — | — |
| Divinyl benzene | — | — | — | 10 | — | — |
| Other monomer | | | | | | |
| Styrene | — | — | — | 1 | 30 | — |
| Polymerization conditions | | | | | | |
| Emulsifier, dispersing agent (parts) | | | | | | |
| Sodium dodecylbenzene-sulfonate | 2 | 2 | 3 | — | 2 | 2 |
| Polyoxyethylene-nonyl-phenyl-ether | — | — | — | 5 | — | — |
| Polymerization initiator (parts) | | | | | | |
| Potassium persulfate | 0.3 | — | — | — | — | — |
| Ammonium persulfate | — | 0.3 | 0.3 | 0.3 | 0.3 | 0.3 |
| Gel content of polymer | | | | | | |
| G1 (%) | 92 | 94 | 86 | 95 | 79 | 80 |
| G2 (%) | 95 | 92 | 96 | 97 | 83 | 85 |
| Evaluation results | | | | | | |
| Bending property | A | A | A | A | A | A |
| Peel strength (g/cm) | 31 | 41 | 43 | 36 | 24 | 27 |
| High temperature initial service capacity (mAh/g) | 311 | 313 | 295 | 308 | 263 | 244 |
| High temp. charge-discharge cycling characteristics (%) | 65 | 65 | 70 | 68 | 39 | 46 |

EXAMPLE 5

The NMP dispersion containing 1.5 parts of polymer particles, prepared in Example 1, was mixed together with 1.5 parts of an ethylene-vinyl alcohol copolymer, 92 parts of lithium cobaltate as an active material instead of natural graphite, and 5 parts of carbon black as an electrically conductive material. The NMP was added to the mixture and the resultant mixture was stirred to give a slurry having a solid content of 55%. A positive electrode was made by using the slurry and a battery was fabricated by the above-mentioned procedure. The gel content of polymer and properties of the positive electrode and battery were evaluated. The results are shown in Table 2.

EXAMPLE 6

By the same procedure as described in Example 5, a positive electrode was made and a battery was fabricated therefrom, wherein the NMP dispersion of polymer particles prepared in Example 2 was used. The gel content of polymer and properties of the positive electrode and battery were evaluated. The results are shown in Table 2.

EXAMPLE 7

By the same procedures as described in Example 5, a positive electrode was made and a battery was fabricated therefrom, wherein the NMP dispersion of polymer particles prepared in Example 3 was used. The gel content of polymer and properties of the positive electrode and battery were evaluated. The results are shown in Table 2.

EXAMPLE 8

By the same procedures as described in Example 5, a positive electrode was made and a battery was fabricated therefrom, wherein the NMP dispersion of polymer particles prepared in Example 4 was used. The gel content of polymer and properties of the positive electrode and battery were evaluated. The results are shown in Table 2.

COMPARATIVE EXAMPLE 3

By the same procedures as described in Example 5, a positive electrode was made and a battery was fabricated therefrom, wherein the NMP dispersion of polymer particles prepared in Comparative Example 1 was used. The gel content of polymer and properties of the positive electrode and battery were evaluated. The results are shown in Table 2.

COMPARATIVE EXAMPLE 4

By the same procedures as described in Example 5, a positive electrode was made and a battery was fabricated therefrom, wherein the NMP dispersion of polymer particles prepared in Comparative Example 2 was used. The gel content of polymer and properties of the positive electrode and battery were evaluated. The results are shown in Table 2.

TABLE 2

|  | Example | | | | Com. Ex. | |
| --- | --- | --- | --- | --- | --- | --- |
|  | 5 | 6 | 7 | 8 | 3 | 4 |
| Polymer composition (parts) | | | | | | |
| Monomer for structural units (a) | | | | | | |
| 2-Ethylhexyl acrylate | 82 | 72 | — | — | 72 | 72 |
| Ethyl acrylate | — | 3 | — | — | 3 | 3 |
| Butyl acrylate | — | — | 70 | — | — | — |
| 2-Ethylhexyl methacrylate | — | — | — | 87 | — | — |
| Monomer for structural units (b) | | | | | | |
| Acrylic acid | 5 | — | 10 | — | — | — |
| Methacrylic acid | — | 25 | 15 | — | 25 | 25 |
| Monomer for structural units (c) | | | | | | |
| 1,3-Butadiene | 10 | — | 5 | 2 | — | 35 |
| Monomer for structural units (d) | | | | | | |
| Ethylene glycol dimethacrylate | 3 | — | — | — | — | — |
| Divinyl benzene | — | — | — | 10 | — | — |
| Other monomer | | | | | | |
| Styrene | — | — | — | 1 | 30 | — |
| Polymerization conditions | | | | | | |
| Emulsifier, dispersing agent (parts) | | | | | | |
| Sodium dodecylbenzene-sulfonate | 2 | 2 | 3 | — | 2 | 2 |
| Polyoxyethylene-nonyl-phenyl-ether | — | — | — | 5 | — | — |
| Polymerization initiator (parts) | | | | | | |
| Potassium persulfate | 0.3 | — | — | — | — | — |
| Ammonium persulfate | — | 0.3 | 0.3 | 0.3 | 0.3 | 0.3 |
| Gel content of polymer | | | | | | |
| G1 (%) | 92 | 94 | 86 | 95 | 79 | 80 |
| G2 (%) | 95 | 92 | 96 | 97 | 83 | 85 |
| Evaluation results | | | | | | |
| Bending property | A | A | A | A | A | A |
| Peel strength (g/cm) | 68 | 72 | 79 | 69 | 50 | 53 |
| High temperature initial service capacity (mAh/g) | 116 | 115 | 111 | 120 | 103 | 101 |
| High temp. charge-discharge cycling characteristics (%) | 61 | 60 | 62 | 64 | 34 | 39 |

As seen from the above results, when the ratio of structural units (a)/[structural units (b) plus structural units (c)] is in the above-specified range, and the sum of the three kinds of structural units (a), (b) and (c) is at least 80%, a lithium ion secondary battery exhibiting improved battery performance at a high temperature can be obtained.

INDUSTRIAL APPLICABILITY

When the binder composition of the present invention is used for making an electrode for a lithium ion secondary battery, a binding force between an active material and a collector is enhanced, and a lithium ion secondary battery having the electrode exhibits improved characteristics at repetition of charge-discharge cycles at a high temperature of 65° C.

Therefore, the above-mentioned lithium ion secondary battery is useful as a current source for a note-sized personal computer and portable electronic appliances such as a portable telephone and a personal digital assistant. The note-sized computer and portable electronic appliances can be rendered high in performance, small in size, thin in thickness and light in weight.

What is claimed is:

1. A binder composition for an electrode of a lithium-ion secondary battery, which comprises particles of a polymer and an organic liquid dispersion medium having a boiling point in the range of 80° C. to 350° C. at normal pressure; the polymer particles being dispersed in the organic liquid dispersion medium, and said polymer comprising:

(a) structural units derived from a monoethylenically unsaturated carboxylic acid ester monomer, and at least one kind of structural units selected from the group consisting of (b) structural units derived from a monoethylenically unsaturated carboxylic acid monomer, and (c) structural units derived from a conjugated diene monomer;

the ratio of structural units (a)/{structural units (b) plus structural units (c)} being in the range of 99/1 to 60/40 by weight, provided that the sum of structural units (a), structural units (b) and structural units (c) is 100;

the sum of structural units (a), structural units (b) and structural units (c) being at least 80% by weight based on the weight of the total structural units of the polymer; and said polymer further comprising 0 to 5% by weight, based on the weight of the polymer, of structural units derived from a monoethylenically aromatic hydrocarbon monomer.

2. The binder composition for an electrode of a lithium ion secondary battery according to claim 1, wherein said polymer particles have a gel content of 50% to 100% by weight as calculated as insoluble matter in an electrolyte; said electrolyte being a 1 mole/liter solution of $LiPF_6$ in a mixed solvent comprised of propylene carbonate/ethylene carbonate/diethyl carbonate/dimethyl carbonate/methyl ethyl carbonate at a ratio of 20/20/20/20/20 by volume at 20° C.

3. The binder composition for an electrode of a lithium ion secondary battery according to claim 1, wherein the polymer particles are contained in an amount of 0.2% to 80% by weight, based on the weight of the binder composition.

4. The binder composition for an electrode of a lithium ion secondary battery according to claim 1, wherein said polymer comprises 0 to 5% by weight, based on the weight of the polymer, of structural units derived from a monomer having a nitrile group.

5. The binder composition for an electrode of a lithium ion secondary battery according to claim 1, wherein the monoethylenically unsaturated carboxylic acid ester monomer giving structural units (a) is at least one monoethylenically unsaturated carboxylic acid ester selected from the group consisting of acrylic acid esters, methacrylic acid esters and crotonic acid esters, which have an alcohol residue having an alkyl group or a substituted alkyl group.

6. The binder composition for an electrode of a lithium ion secondary battery according to claim 1, wherein the monoethylenically unsaturated carboxylic acid monomer giving structural units (b) is at least one monoethylenically unsaturated carboxylic acid selected from the group consisting of (i) a monoethylenically unsaturated monocarboxylic acid selected from acrylic acid, methacrylic acid and crotonic acid, and (ii) a monoethylenically unsaturated dicarboxylic acid selected from maleic acid, fumaric acid, citraconic acid, mesaconic acid, glutaconic acid and itaconic acid, and anhydrides thereof.

7. The binder composition for an electrode of a lithium ion secondary battery according to claim 1, wherein the conjugated diene monomer giving structural units (c) is at least one monomer selected from the group consisting of 1,3-butadiene, 1,3-pentadiene, isoprene, 1,3- and 2,4-hexadiene, 2,3-dimethyl-1,3-butadiene, 2-ethyl-1,3-butadiene and 1,3-heptadiene.

8. The binder composition for an electrode of a lithium ion secondary battery according to claim 1, wherein said polymer further comprises (d) structural units derived from a polyfunctional ethylenically unsaturated monomer in an amount of 0.1 to 20% by weight based on the total structural units.

9. The binder composition for an electrode of a lithium ion secondary battery according to claim 1, wherein said polymer particles have a gel content of 50% to 100% by weight as calculated as insoluble matter in the organic liquid dispersion medium.

10. A slurry for an electrode of a lithium ion secondary battery, which comprises the binder composition as claimed in claim 1, and an active material.

11. An electrode of a lithium ion secondary battery, which is made by coating a collector with the slurry as claimed in claim 10, and then drying thus-formed coating.

12. The electrode of a lithium ion secondary battery according to claim 11, wherein the collector has a sheet form having a thickness of 0.001 to 0.5 mm.

13. A lithium ion secondary battery, which is provided with the electrode as claimed in claim 11.

14. The binder composition for an electrode of a lithium ion secondary battery according to claim 1, wherein the content of water in the organic liquid dispersion medium is not larger than 3% by weight.

15. A process for preparing the binder composition as claimed in claim 1, which comprises:

preparing a latex comprising the polymer particles as described in claim 1; and then substituting water contained in the latex with an organic liquid dispersion medium having a boiling point in the range of 80° C. to 350° C. at normal pressure.

16. A method for preparing the slurry as claimed in claim 10, which comprises incorporating an active material in the binder composition as claimed in claim 1.

17. A process for making electrode of a lithium ion secondary battery, which comprises:

coating a collector with the slurry as claimed in claim 10; and then drying the thus-formed coating to fix the active material on the collector.

18. A lithium ion secondary battery, which comprises the electrode as claimed in claim 11, and an electrolyte solution.

* * * * *